Oct. 9, 1928.
A. D. PRICE
LAMP
Filed Sept. 9, 1926
1,687,141
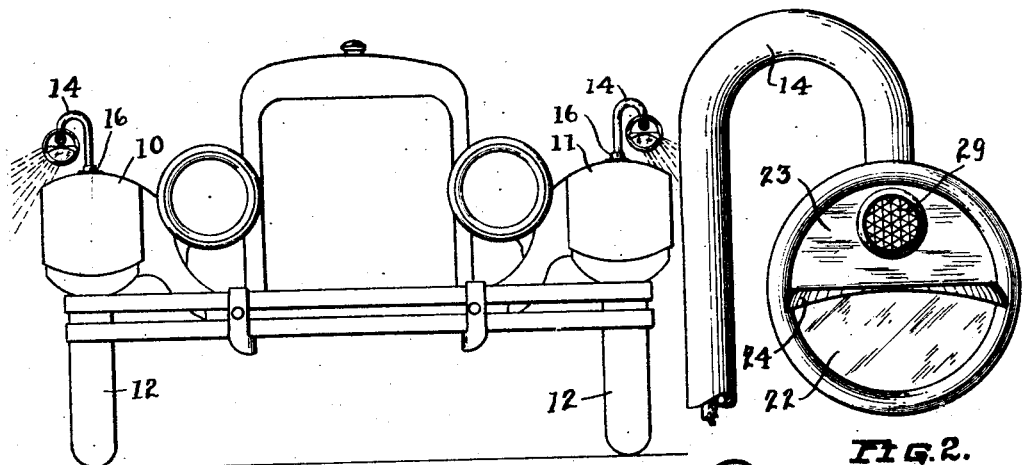
Fig.1.
Fig.2.
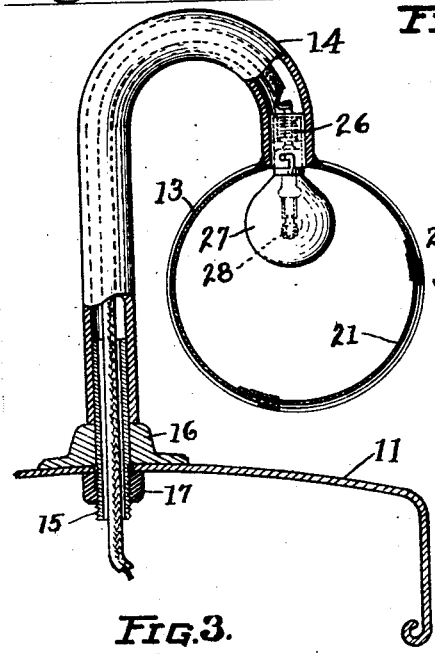
Fig.3.
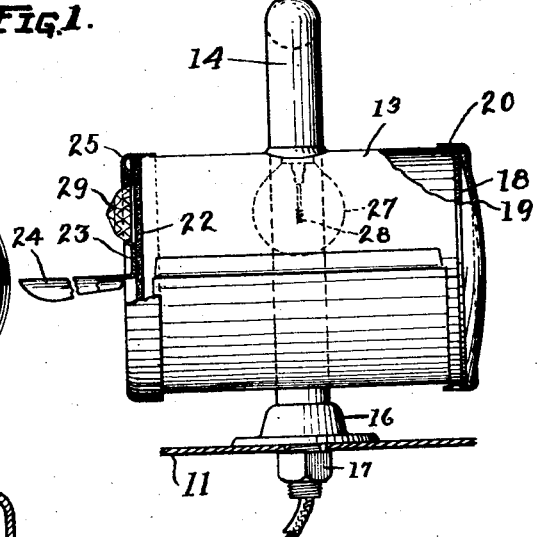
Fig.4.
Inventor
ALFRED D. PRICE.
Kwis Hudson & Kent.
ATTORNEYS.

Patented Oct. 9, 1928.

1,687,141

UNITED STATES PATENT OFFICE.

ALFRED D. PRICE, OF EAST CLEVELAND, OHIO.

LAMP.

Application filed September 9, 1926. Serial No. 134,363.

This invention relates to lamps and more particularly to automobile lamps.

It is one of the objects of the invention to provide an improved form of lamp construction that will be adapted to illuminate a portion of the road, in advance of the automobile, without subjecting oncoming vehicles to objectionable glare.

A further object of the invention is to provide a lamp, of the character specified, that will also be adapted to illuminate the side of the road along the side of the vehicle.

A further object of the invention is to provide a lamp construction, having the features above specified, that will be attractive in appearance and will be adapted for mounting on the automobile fenders.

Other objects of the invention and the features of novelty will be apparent from the following description taken in connection with the accompanying drawings, of which:

Fig. 1 is a front elevation of an automobile having lamps, embodying my invention, mounted on the front fenders thereof;

Fig. 2 is an enlarged front elevation of the lamp illustrated in Fig. 1;

Fig. 3 is a central transverse section through the lamp illustrated in Fig. 2; and Fig. 4 is an elevation of the lamp, as seen from the right of Fig. 2, certain parts being shown in section.

Referring to the drawings, 10 and 11 indicate the front fenders of an automobile, the wheels of which are indicated at 12. My improved lamp consists of a cylindrical shell 13, the axis of which extends longitudinally of the vehicle. A tubular bracket 14 has a U-bend at its upper end and is secured to the upper side of the shell 13 by soldering or in any other suitable manner. A nipple 15 is secured in the lower end of the bracket 14 and a flange 16 is arranged on the nipple 15, this flange being adapted to engage the upper side of the fender, and the bracket being secured by the nut 17 which engages with the under side of the fender.

The rear end of the shell 13 is closed by means of a reflector plate 18 which may be in the form of silvered glass or metal, and outside of this plate I arrange a convex mirror 19 for the purpose of enabling the occupants of the automobile to have a view of the road in the rear. The plate 18 and the mirror 19 may be secured in position by a bezel 20.

The lower quarter of the shell 13, adjacent the outer edge of the fender, is provided with an opening in which there is mounted a window 21 of transparent material such as glass or celluloid. The front end of the shell 13 is provided with a lens 22, over the upper half of which there is an opaque shield 23, and this shield may be provided with a forward extension or vizor 24. The lens 22 and the shield 23 are held in position by a removable bezel 25.

Arranged within the tubular bracket 14 is a lamp socket 26, of ordinary construction, to receive and support an electric bulb 27. By this arrangement the filament 28, of the bulb 27, is positioned considerably above the axis of the shell 13 so that the light rays, which pass through the lens 22, are confined to a downwardly inclined direction which illuminates the road for a sufficient distance in front of the automobile without subjecting occupants of oncoming machines to the glare of horizontal rays such as are projected from ordinary headlights. The shell 13 is made of sheet metal and the interior thereof is coated with a suitable reflecting material, such as silver, so that there will be a substantial amount of illumination of the road along the side of the automobile, the light rays passing through the window 21.

I prefer to mount in the shield 23 a small colored lens 29, or bull's eye, which will be illuminated by the bulb 27, and, in order to indicate the position of the automobile, one of these lenses may be red and the other green, according to the custom of indicating the sides of ships by means of colored lights.

Having thus described my invention, I claim:

In a lamp for an automobile, a substantially cylindrical shell adapted to be arranged with its axis extending longitudinally of the automobile, a tubular supporting bracket secured to the top of said shell having a portion arranged in lateral spaced relation thereto whereby when said bracket is secured to the fender of an automobile the outer side of the shell will lie substantially vertically above the outer edge of the fender, said shell having a window along one side through which light may be projected along the side of the road and a window at its front end, a reflector on the interior of the rear wall of the shell adapted to project light through the last mentioned window, an opaque shield in the upper portion of the front end of said shell for directing the light rays downwardly, a colored lens mounted in the shield above the plane of the downwardly directed light rays, and a lamp receiving socket arranged in said bracket adjacent to its point of connection to the shell.

In testimony whereof, I hereunto affix my signature.

ALFRED D. PRICE.